Jan. 13, 1948.  J. LICHTENSTEIN ET AL  2,434,420
INDUCTION PRESSURE REGULATOR
Filed April 19, 1937     5 Sheets-Sheet 4

Inventors:
Johann Lichtenstein +
Paul Xavier Auguste Gistucci,
By Jesse B. Heller, Atty Patented Jan. 13, 1948

2,434,420

UNITED STATES PATENT OFFICE 2,434,420

INDUCTION PRESSURE REGULATOR

Johann Lichtenstein, Levallois-Perret, and Paul Xavier Auguste Gistucci, Paris, France, assignors to Societe Generale des Carburateurs Zenith, Geneva, Switzerland Application April 19, 1937, Serial No. 137,814
In Belgium April 22, 1936

Section 3, Public Law 690, August 8, 1946
Patent expires April 22, 1956

9 Claims. (Cl. 123—103)

This invention relates to induction pressure regulators for internal combustion engines.

Modern aero engines are, for the most part, made in such a manner as to be able to develop their maximum power output at a predetermined altitude, known as the rated altitude. This performance is usually obtained by means of a supercharger which raises the pressure of air or of mixture delivered to the engine, and which thus compensates for the decrease in atmospheric pressure due to altitude. In other cases, the engine has cylinders with a greater volume than the cylinders of an engine of equal power intended to be run only at ground level. The engine can therefore develop its maximum power at the rated altitude, despite the more rarefied air at this altitude, by virtue of this increase of volume of the cylinders.

In either event, it is desirable to provide an induction pressure regulator often called "boost control," which has as its object the limiting of the amount of charge (air or mixture) admitted to the engine at altitudes which are lower than the rated altitude, so as to make sure that the engine shall not develop a greater power than the maximum power for which it has been designed.

Induction pressure regulators comprise, in general, a servo-motor whose power member controls a device for regulating the quantity of charge (air or mixture) admitted to the engine, and which is located in the intake manifold of the latter. The power member of the servo-motor controls, for example, a throttle located in the intake manifold, or, alternatively, the control member of a variable-speed or variable delivery supercharger located in this manifold, the supercharger itself then constituting the device for regulating the amount of charge (air or mixture) admitted to the engine. The induction pressure regulator comprises essentially a chamber communicating with the intake manifold of the engine on the delivery side of the said device for regulating the quantity of air or mixture admitted to the engine. In this chamber is located an extensible manometric element, which is connected to the energizing member of the servo-motor of the induction pressure regulator. Variations in induction pressure on the delivery side of the said device for regulating the amount of air or mixture admitted to the engine thus produce variations in the length of the manometric element, which result in putting the servo-motor into action. The term "datum of the induction pressure regulator," or "rated induction pressure," means the pressure in the intake manifold on the delivery side of the said regulating device at which the induction pressure regulator is in equilibrium, that is to say at which the power member of the servo-motor is at rest, the energizing member of the servo-motor occupying its neutral position.

The amount of air or mixture admitted to the engine is further controlled by the pilot. A single throttle may, for example, be controlled by the combined action of an induction pressure regulator and the pilot's lever, or, alternatively, the induction pressure regulator and the pilot's lever may govern two distinct members for regulating the amount of air or mixture admitted to the engine, as, for example, two separate throttles, or again one throttle and one variable delivery or variable speed supercharger. The manner in which the control by the pilot's lever of the amount of air or mixture admitted to the engine is specifically carried out matters little so far as the object of the present application is concerned.

In the majority of induction pressure regulators known at the time of writing, the induction pressure regulator is so arranged that it maintains a constant pressure in the intake manifold on the delivery side of the control device which it governs, at least when the pilot's lever is put in a position which corresponds to the maximum amount of air or mixture admitted to the engine (fully open position if the lever controls a throttle). In other words, the datum of the induction pressure regulator is generally invariable, for this position of the pilot's lever. In fact, the induction pressure regulator has for its object to prevent the induction pressure from exceeding the maximum pressure compatible with good performance of the engine, and, in particular, to avoid the phenomena of detonation which appear when the induction pressure is too high. It is only in the first approximation that the maximum induction pressure can be considered as constant. In fact, the maximum induction pressure compatible with good performance of the engine is variable in accordance with running conditions of the latter, and, especially, with the altitude.

The present invention has for its object an induction pressure regulator comprising a device for varying the datum in proportion to the altitude. The influence of altitude on the maximum induction pressure compatible with good performance of the engine is complex. This maximum induction pressure mainly depends on engine temperature, temperature of the air drawn in, and engine speed. When the altitude varies, these several conditions themselves vary and it is the sum of their variations which ultimately determines the variation of maximum induction pressure compatible with good performance of the engine in proportion to the altitude. Most commonly, this maximum permissible induction pressure diminishes when the altitude increases, but no absolute ruling, however, can be given on this point. Usually an increase in engine temperature calls for a reduction in the maximum allowable induction pressure; an increase in temperature of the air admitted to the engine allows an increase in this pressure; an increase in engine speed allows an increase in this pressure, and, finally, an increase in the richness of the mixture allows an increase in this pressure. By way of example, in an air-cooled engine, an increase in altitude is accompanied by an increase in engine temperature, a reduction in the temperature of air admitted, and an increase in speed. These several variations do not all take effect in the same way, so that it is impossible to forecast accurately if the maximum allowable induction pressure increases or decreases when the altitude increases. In general, however, it can be said that the maximum allowable induction pressure decreases when the altitude increases.

In one embodiment of the invention, the energizing member of the servo-motor of the induction pressure regulator is governed by the combined action of the manometric element located in the chamber of the induction pressure regulator which is connected to the intake manifold on the delivery side of the mixture regulating device governed by the induction pressure regulator, and by a movable wall subjected to atmospheric pressure or to the pressure obtaining in the intake manifold on the suction side of the control device, for example in the air inlet of the engine.

The said movable wall may be constituted by a closed extensible capsule (manometric element) exposed to the atmosphere or located in a chamber communicating with the intake manifold on the suction side of the said mixture regulating device, for example with the air inlet.

In an alternative embodiment, the interior of the capsule communicates with the intake manifold on the delivery side of the said mixture regulating device.

The said movable wall may equally well be constituted by a piston sliding in a cylinder and defining two compartments in the latter. One of these compartments is connected to the intake manifold on the delivery side of the said mixture regulating device, whilst the other compartment is connected to the atmosphere or to the intake manifold on the suction side of this regulating device, for example to the air inlet.

Figure 1:
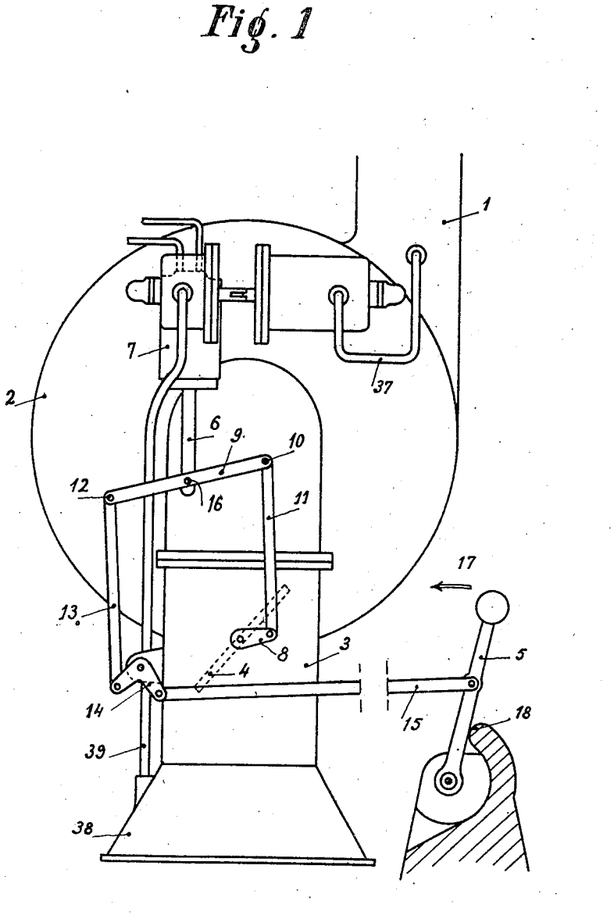
Fig. 1 shows diagrammatically in elevation the intake manifold of an engine furnished with an induction pressure regulator according to the invention.

In the device shown in Fig. 1, the intake manifold 1 of the engine is fed with air or combustible mixture by a supercharger 2. This supercharger itself receives air or combustible mixture from a carburetter 3. The amount of air or mixture admitted to the engine is meted out by a throttle 4 which is controlled by the combined action of the pilot's lever 5 and the power member 6 of an induction pressure regulator 7 furnished with a servo-motor. A lever 8 carried on the throttle spindle is connected to a free lever 9 by a rod 11 pivotally attached at 10 to one of the ends of the lever 9. The other end 12 of the lever 9 is connected to the pilot's lever 5 by a rod 13, a bell crank 14, and a rod 15. The power member 6 of the servo-motor of the induction pressure regulator 7 is connected to a point 16 on the lever 9. The working of an arrangement of this kind is well known. If the induction pressure regulator 7 is at rest, the power member 6 of its servo-motor is immobile, and the point 16 on the lever 9 is stationary. Movement of the pilot's lever 5 in the direction of the arrow 17 therefore produces a movement of the throttle 4 in the closing direction by virtue of the various connections shown. The throttle 4 reaches the fullest open position allowed by the induction pressure regulator 7 when the lever 5 is brought in contact with the stop 18 at the fully open position.

Figure 2:
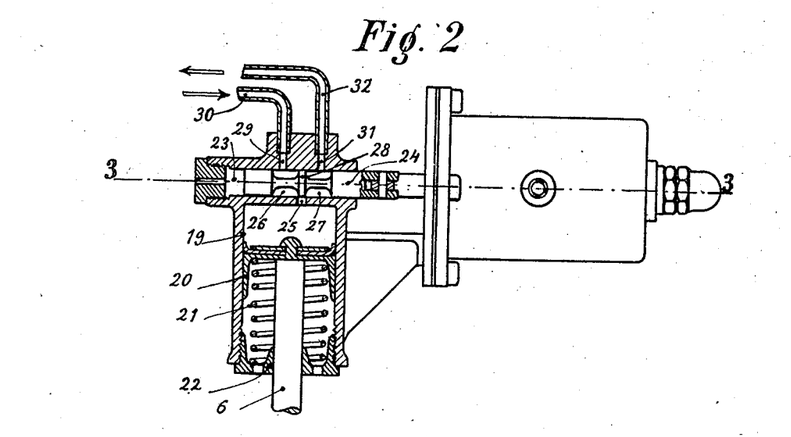
Fig. 2 shows in part-sectional elevation the induction pressure regulator shown in Fig. 1.

When the pilot's lever 5 occupies a predetermined position the end 12 of the lever 9 is fixed, and a downward movement of the power member 6 of the servo-motor of the induction pressure regulator 7 produces, through the connections described, a movement of the throttle 4 in the closing direction. The detail of the servo-motor of the induction pressure regulator 7 is shown in Fig. 2. This servo-motor, moreover, is known per se. It comprises a cylinder 19 in which a spring loaded piston 20 moves. The power member 6 is constituted by a spindle fixed to the piston 20 and passing through a guide 22. In the head of the cylinder 19 is formed a cylindrical bore 23 which communicates with the cylinder 19 through the orifice 25. The plunger 24 carries two annular passages 26 and 27 separated by a ring 28. The bore 23 communicates by a passage 29 with an oil pressure pipe 30 connected, for instance, to the pressure-lubricating circuit of the engine, and it communicates by a passage 31 with an oil outlet pipe 32. The passages 29 and 31, the annular slots 26 and 27 and the ring 28 are disposed in such a manner that the passages 29 and 31 can never be covered by the plunger 24 in such a way as to remain always in communication respectively with the slots 26 and 27.

In Fig. 2, the plunger 24 is shown in its neutral position. The ring 28 partially covers the orifice 25 but allows a slight passage for oil on either side of this ring. A flow of oil thus takes place from the oil pressure pipe 30 towards the oil outlet pipe 32 through the annular passage 26, passages being open on both sides of the ring 28 between this ring and the edges of the orifice 25 and the annular passage 27. The pressure of oil in the cylinder 19 balances the pressure of the spring 21 on the piston 20. The neutral position of the plunger 24 is that at which no flow of oil can take place between the cylinder 19 and the bore 23, the piston 20 being then at rest. If the plunger 24 is moved towards the left, the size of the passage between the cylinder 19 and the oil outlet pipe 32 formed by the orifice 25 and the channel 27, increases; the piston 20, under the influence of the spring 21, urges the oil towards the outlet pipe 32. The piston and the power member 6 then move upwardly. If, on the contrary, the plunger 24 is moved towards the right, away from its neutral position, the size of the passage between the pipe 30 and the cylinder 19 increases, so that the oil under pressure leaving the pipe 39 is introduced into the cylinder 19 through the pipe 26 and the orifice 25. This oil under pressure moves the piston 20 and the power member 6 downwardly against the pressure of the spring 21.

As far as the present invention is concerned, the type of servo-motor employed matters little, and the relay device shown can be replaced by any other common type, provided that the energizing member and the power member of the new servo-motor are subjected to the same connections as the energizing member 24 and the power member 6, as have been shown in the drawing.

Figure 3:
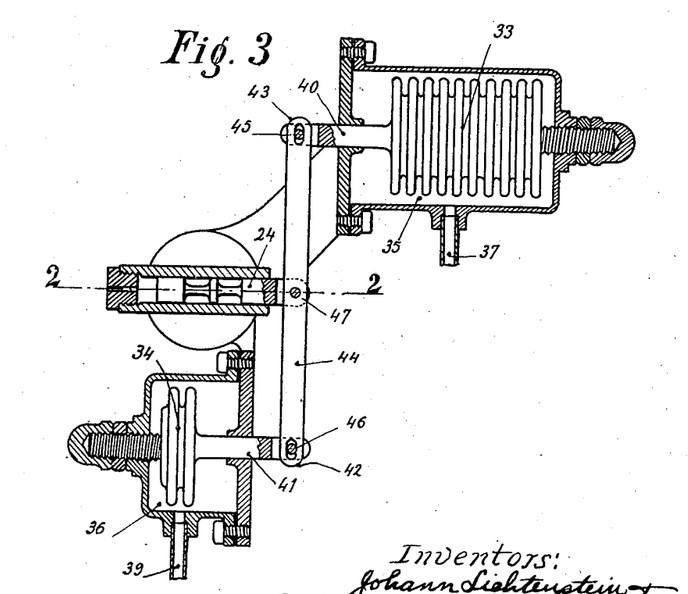
Fig. 3 shows a horizontal section on the line 3—3 of the induction pressure regulator shown in Fig. 2.

Control of the energizing member 24 can be seen in Fig. 3. It comprises two capsules 33 and 34, located respectively in the chambers 35 and 36. The chamber 35 communicates with the intake manifold 1 on the delivery side of the supercharger 2, by a pipe 37 (Fig. 1), whilst the chamber 36 communicates with the air inlet 38 of the engine by a pipe 39 (Fig. 1). The capsule 34 could equally well be subjected directly to atmospheric pressure. The capsules 33 and 34 are connected respectively through two spindles 40 and 41 with the two ends 42 and 43 of a lever 44 by means of studs 45 and 46 which engage respectively with corresponding sockets formed in the lever.

The lever 44, moreover, is pivoted on a stud 47 carried by the energizing member 24 (plunger).

The working of the device is as follows:

For a given altitude less than the rated altitude, that is to say for a given value of atmospheric pressure or the pressure obtaining in the engine air inlet 38, and, when the pilot's lever 5 is maintained in contact with the stop 18 in the fully open position, the capsule 34 has a predetermined length and the stud 46 occupies a fixed position so long as the altitude does not vary. When the induction pressure obtaining in the manifold 1 varies, this pressure being transmitted to the chamber 35 by the pipe 37, the length of the capsule 33 located in this chamber varies correspondingly and controls the movements of the plunger 24 of the servo-motor by means of the lever 44 which pivots about the fixed point 46. The induction pressure regulator thus functions in the manner common in induction pressure regulators of current type. If the induction pressure is greater than the rated pressure, the plunger 24 is moved to the right by the capsule 33; the piston 20 and the power member 6 move downwardly and produce a closing movement of the throttle 4 which shows by a decrease in induction pressure. The opposite occurs if the induction pressure is less than the rated pressure, and ultimately the members of the induction pressure regulator and the throttle 4 take up a position of equilibrium at which the plunger 24 occupies its neutral position, the induction pressure in the manifold 1 being equal to the rated induction pressure. At the altitude stated, the induction pressure regulator thus prevents the induction pressure from exceeding the rated induction pressure corresponding to the altitude. The rated induction pressure is thus the maximum allowable pressure, since the lever 5 occupies the fully open position.

If the altitude increases, the atmospheric pressure or the pressure in the air inlet 38 decreases, and the capsule 34 located in the chamber 36 grows longer. It moves the stud 46 carried by the spindle 41 to the right, and the capsule 33 must itself grow longer to restore the plunger 24. The rated induction pressure for this higher altitude then corresponds to a greater length of the capsule 33, that is to say that this rated induction pressure is weaker. It can thus be seen that, in the apparatus shown, the rated pressure, and, in consequence, the maximum induction pressure, becomes less as the altitude increases. To regulate the variation in maximum induction pressure in proportion to the altitude, either the length or the diameter of the capsule 34 may be acted upon, or again the respective lengths of the arms of the lever 44.

As has already been pointed out, the pilot's lever 5 does not necessarily control the same regulating device of the quantity of air or mixture as does the induction pressure regulator. The power member 6 of the induction pressure regulator could, for example, be directly connected to the lever 8 of the throttle 4. The lever 5 could then control a separate throttle, and the entry to the manifold where this throttle would be placed, whether on the suction or the delivery side of the throttle 4, or whether on the delivery side of the supercharger 2, would matter little, since, so far as this invention is concerned, the position of maximum opening by the lever 5 is being considered, that is to say the position at which this second throttle would be fully open and would not come into action to modify the pressure obtaining in the various inlets of the intake manifold to any sensible degree. Besides, it should be added that the power member 6 of the servo-motor could act on any regulating device over the quantity of air or mixture admitted to the engine, besides a throttle, without the working being changed from what it is, since the nature of the member by which the variation of the amount of air or mixture admitted is performed, does not play any part in the invention.

Figure 4:
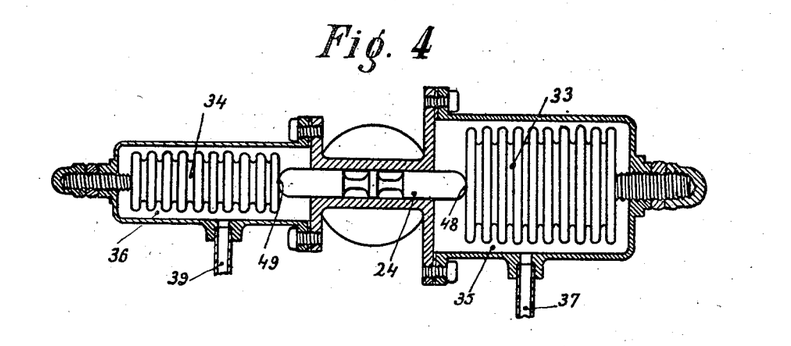
Figs. 4 to 8 show several varying embodiments of induction pressure regulators seen on a horizontal line analogous to the section 3—3.

In Fig. 4, the capsules 33 and 34 located respectively in the chambers 35 and 36 which communicate one by the pipe 37 with the intake manifold 1, and the other by the pipe 39 with the air inlet 38 or with the atmosphere, are applied against the two opposite ends 48 and 49 of the plunger 24 of the servo-motor of the induction pressure regulator. For a given value of altitude, the pressure in the chamber 36 is thus determined, and the load which the capsule 34 exerts on the end 49 of the plunger 24 is itself also determined. At this altitude, the induction pressure regulator functions in the normal manner. If the altitude increases, the pressure to which the capsule 34 is exposed decreases, and, as a result, the load exerted by the capsule 34 on the end 49 of the plunger 24 increases. The load which the capsule 33 must exert on the opposite end 38 of the plunger, in order to balance the load of the capsule 34 on the end 49, must itself increase by the same amount. In order for this load to increase, it is essential that the pressure in the chamber 35 should decrease. With this arrangement, the rated pressure decreases therefore when the altitude increases, and the maximum induction pressure also decreases. The influence of altitude on the maximum induction pressure may be regulated by choosing a capsule 34 of appropriate dimensions, and chiefly of a diameter appropriate in proportion to the diameter of the capsule 33.

In the apparatus shown in Fig. 3 and Fig. 4, the maximum induction pressure diminishes when the altitude increases. These arrangements may be easily modified so that the maximum induction pressure may increase, as has been shown in Figs. 5 to 7, instead of diminishing when the altitude increases.

Figure 5:
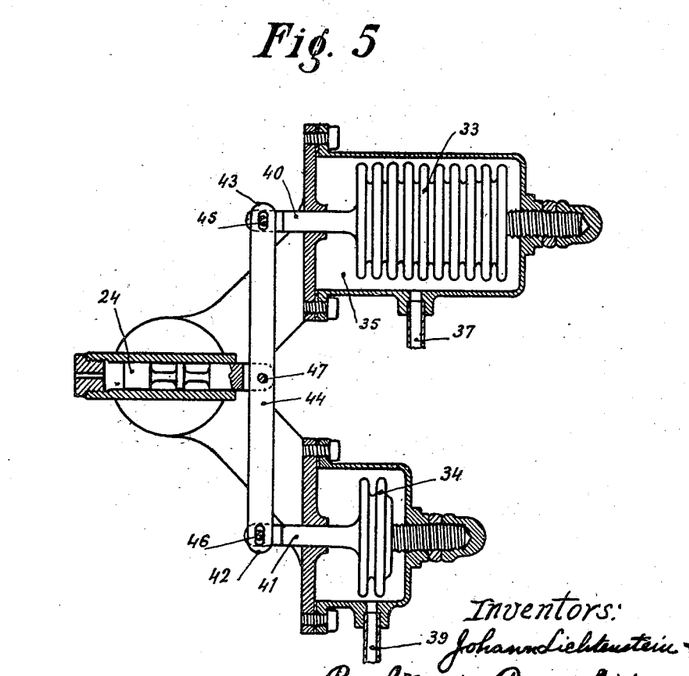

The arrangement shown in Fig. 5 corresponds to the arrangement shown in Fig. 3; it differs from it only in the location of the capsule 34 in relation to the lever 44. An increase in length of the capsule 34 produced by an increase in the altitude, produces a movement towards the right of the end 48 of the lever 44, instead of producing a movement of this end towards the left, as in the arrangement shown in Fig. 3. It can thus at once be seen that, to compensate for this movement, the capsule 33 must become shorter, to correspond to an increase in the rated induction pressure in proportion to the altitude.

Figure 6:
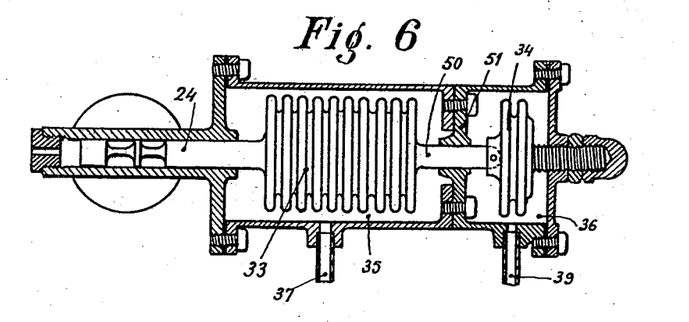

The arrangement shown in Fig. 6 is absolutely analogous to the arrangement shown in Fig. 2, and only differs in the mechanical connection between the capsules and the plunger. On this figure, the two chambers 35 and 36 connected respectively by the pipes 37 and 39 to the intake manifold on the delivery side of the air or mixture regulating device and to the air inlet of the engine or to the atmosphere, are located one behind the other. The capsule 34 is fixed to the bottom of the chamber 36, and is connected to the capsule 33 by a spindle 50 passing through a guide member pierced in the wall 51 separating the two chambers 35 and 36. The plunger 24 is carried by the second extremity of the capsule 33. In this arrangement, movement of the plunger 24 is thus equal to the sum of the extensions of the capsules 33 and 34. It is the same in the arrangement shown in Fig. 5, except that different coefficients are introduced by the presence of the lever 44.

Figure 7:
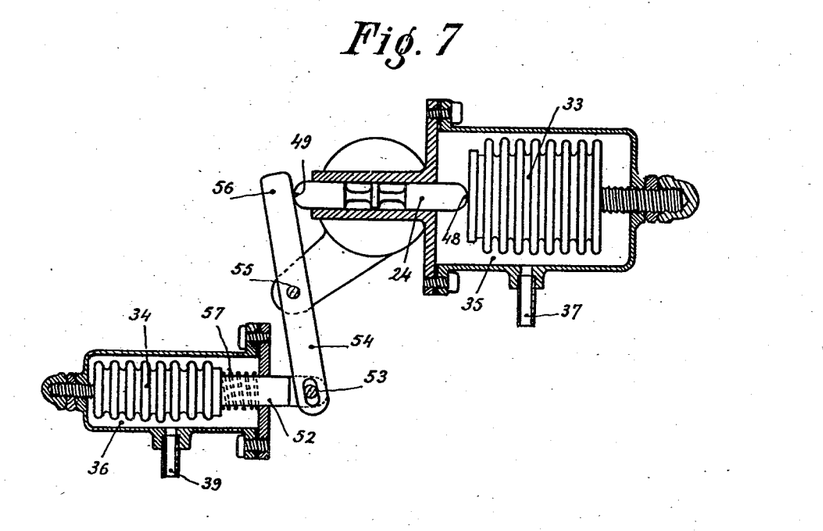

The arrangement shown in Fig. 7 corresponds to the arrangement shown in Fig. 4. To reverse the direction of action of the capsule 34 on the plunger 24 and the capsule 33, this capsule 34 acts on the plunger 24 through a lever, instead of acting directly on this plunger as in the arrangement shown in Fig. 4. The capsule 34 carries a spindle 52 connected by a stud 53 to one of the ends of a lever 54. The lever 54 pivots about an axis 55 and its opposite end 56 is maintained up against the end 49 of the plunger 24 by the force of the capsule 34. The load exerted by the capsule 34 is transmitted to the capsule 33 through the lever 54 and the plunger 24. In order that the capsule 34 may always be compressed in such a manner as to maintain the end 56 of the lever 54 in contact with the end 49 of the plunger 24, the capsule 34 is loaded by a spring 57. In general, all the capsules that have been shown in the figures of the present application can be coupled to a spring of suitable type whose elasticity is added to the normal elasticity of the capsule, to give to the latter the amount of increase that is desirable, in proportion to the variations of pressure to which the capsule is subjected.

In the arrangement shown in Fig. 7, the capsule 34 tends to grow longer under the influence of a decrease in pressure in the chamber 36 corresponding to an increase in altitude, and, as a result, the pressure which said capsule exerts, through the lever 54, on the plunger 24 grows less. The pressure in the chamber 35 to which the capsule 33 is submitted, must thus increase to compensate for this decrease in load and to maintain the plunger 24 in its neutral position. In this arrangement, the rated induction pressure increases therefore as the altitude increases.

In the arrangements previously described, the capsule 34 is closed, and is either empty, or filled with a gas whose pressure remains sensibly constant, this pressure being capable of variation to a certain extent with temperature. The induction pressure regulator forming the object of the present invention does not maintain the induction pressure strictly constant, since it has for its object, on the contrary, to make this induction pressure vary in proportion to the altitude. The variations of the induction pressure regulated in this manner are, however, a great deal more slight than the variations in atmospheric pressure, and in every case they depend on the variations of this atmospheric pressure. One may therefore replace the substantially constant pressure obtaining in the interior of the capsule 34 by the induction pressure, that it to say the pressure obtaining in the intake manifold on the delivery side of the mixture regulating device governed by the induction pressure regulator.

Figure 8:
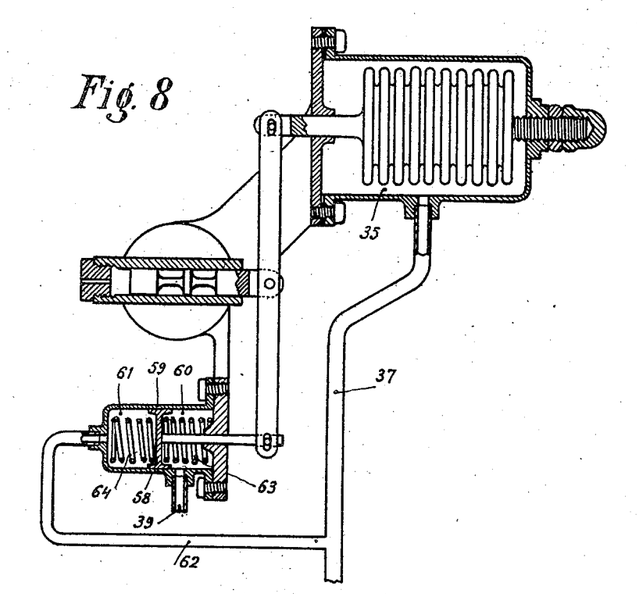

Fig. 8 shows this variation of construction applied to the arrangement shown in Fig. 3. The capsule 34 is replaced by a piston 58 sliding in a cylinder 59 and defining two compartments 60 and 61. The compartment 60 plays exactly the same part as the chamber 36 of the device shown in Fig. 3, and is connected by a conduit 39 to the air inlet of the engine or to the atmosphere. The compartment 61, which takes the place of the interior of the capsule 34, is connected by a conduit 62 to the conduit 37 which establishes communication between the chamber 35 and the intake manifold on the delivery side of the mixture regulating device. The compartment 61 does itself communicate with the intake manifold on the delivery side of the mixture regulating device. The piston 58 is loaded by two springs 63 and 64 whose difference in force balances the difference in pressure existing on one side and the other of the piston 58. The working of this arrangement is absolutely similar to the working of the device shown in Fig. 3.

It is clear that the replacement of the capsule 34 by the piston 58 sliding in the cylinder 59 could be brought about in the same manner in all the other arrangements above described.

Figure 9:
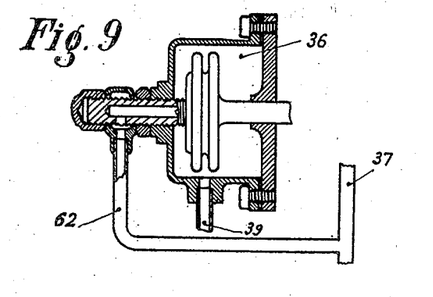
Fig. 9 shows in horizontal section the variation of a detail of the device shown in Fig. 3.

Instead of replacing the capsule 34 by a piston 58, this capsule could remain and be located in the chamber 36, as in the arrangement previously described, but, instead of employing a closed capsule, the interior of the capsule might communicate by means of a pipe 62 (Fig. 9), with the pipe 37 which itself communicates with the intake manifold on the delivery side of the mixture regulating device governed by the induction pressure regulator, in the same manner as the compartment 61 of the arrangement shown in Fig. 8. The arrangement shown in Fig. 9 is mechanically equivalent to the arrangement shown in Fig. 8.

In the preceding figures, has been described the control of the energizing member of the servo-motor of the induction pressure regulator by two capsules, of which one may be replaced by a piston if so desired. The mechanical connection between the energizing member (plunger 24) and the two capsules can obviously be carried out in several forms. These connections can be classified into two categories. In one of the categories (Figs. 3 and 5), the two capsules grow longer independently one of the other, and their increase in length, multiplied if desired by the resulting co-efficient of the arms of the lever employed, add one to another to produce the final displacement of the energizing member (plunger 24). If one of the capsules is replaced by a piston, the movement of the piston plays the same part as the increase in length of the capsule which the piston replaces. In the other category, the second capsule (capsule 34 or equivalent piston) which is submitted to the atmospheric pressure or to the pressure obtaining in the intake manifold on the suction side of the mixture regulating device governed by the induction pressure regulator, comes into action to modify the load which the capsule 33 disposed in the chamber 35 communicating with the intake manifold I exerts, that is to say to modify the pressure in the chamber 35, at which the capsule 33 has such a length that the energizing member (plunger 24) occupies its neutral position.

We claim:

1. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a first manometric member responsive to pressure conditions in said posterior zone, another manometric member responsive to pressure conditions in said anterior zone, means operative by said first manometric member for imparting a motion to said energizing member, and means operative by said other manometric member for imparting a superimposed motion to said energizing member.

2. In an induction pressure regulator for an internal combustion engine, having a servo-motor with an energizing member and a power member operating a device in the engine intake for regulating the amount of charge admitted to the engine, a control of said energizing member, which comprises, in combination, a manometric member responsive to the pressure in said intake posterior to said device, an operative connection between said manometric member and said energizing member, and means responsive to the altitude for loading said manometric member.

3. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a first manometric member responsive to pressure conditions in said posterior zone, another manometric member responsive to pressure conditions in said anterior zone, an operative connection between said manometric members, and an operative connection between one of said manometric members and said energizing member.

4. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a first chamber having communication with said posterior zone, a first manometric member in said chamber, a second chamber having communication with said anterior zone, a second manometric member in said second chamber, means operative by said first manometric member for controlling said energizing member, and means operative by said other manometric member for altering the control of said energizing member by said first manometric member.

5. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a first chamber having communication with said posterior zone, a first manometric member in said chamber, a second chamber having communication with said anterior zone, a second manometric member in said second chamber, means operative by said first manometric member for imparting a motion to said energizing member, and means operative by said other manometric member for imparting a superimposed motion to said energizing member.

6. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a first chamber having communication with said posterior zone, a first manometric chamber in said chamber, a second chamber having communication with said anterior zone, a second manometric member in said second chamber, an operative connection between said manometric members, and an operative connection between one of said manometric members and said energizing members.

7. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a chamber having communication with said posterior zone, a manometric member in said chamber, a movable wall, two compartments separated by said movable wall, a passage from one of said compartments to said posterior zone, a passage from the other compartment to said anterior zone, means operative by said manometric member for controlling said energizing member, and means operative by said movable wall for altering the control of said energizing member by said manometric member.

8. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a chamber having communication with said posterior zone, a manometric member in said chamber, a movable wall, two compartments separated by said movable wall, a passage from one of said compartments to said posterior zone, a passage from the other compartment to said anterior zone, means operative by said manometric member for imparting a motion to said energizing member, and means operative by said movable wall for imparting a superimposed motion to said energizing member.

9. In an induction pressure regulator for an internal combustion engine, having a servo-motor with an energizing member and a power member operating a device in the engine intake for regulating the amount of charge admitted to the engine, said device separating a posterior zone comprising the portion of the intake posterior to said device and an anterior zone comprising the portion of the intake anterior to said device and the atmosphere, a control of said energizing member, which comprises, in combination, a chamber having communication with said posterior zone, a manometric member in said chamber, a movable wall, two compartments separated by said movable wall, a passage from one of said compartments to said posterior zone, a passage from the other compartment to said anterior zone, an operative connection between said movable wall and said manometric member, and an operative connection between said manometric member and said energizing member.

JOHANN LICHTENSTEIN.
PAUL XAVIER AUGUSTE GISTUCCI.

REFERENCES CITED

The following references are of record in the file of this patent:

UNITED STATES PATENTS

| Number | Name | Date |
| --- | --- | --- |
| 1,802,848 | Summers | Apr. 28, 1931 |
| 1,951,927 | Dodson | Mar. 20, 1934 |
| 1,955,037 | Viel | Apr. 17, 1934 |
| 1,995,800 | Dodson | Mar. 26, 1935 |
| 2,008,143 | Mock | July 16, 1935 |
| 2,024,202 | Berger | Dec. 17, 1935 |

FOREIGN PATENTS

| Number | Country | Date |
| --- | --- | --- |
| 272,863 | Great Britain | Oct. 27, 1927 |